Nov. 10, 1959  N. W. KIRSCHKE  2,912,559
OVEN WITH REPLACEABLE LINER
Filed May 8, 1958  2 Sheets-Sheet 1

INVENTOR.
NORMAN W. KIRSCHKE
BY T. G. Dysart
HIS ATTORNEY

Nov. 10, 1959 N. W. KIRSCHKE 2,912,559
OVEN WITH REPLACEABLE LINER
Filed May 8, 1958 2 Sheets-Sheet 2

INVENTOR.
NORMAN W. KIRSCHKE
BY T.G. Dysart
HIS ATTORNEY

United States Patent Office 2,912,559
Patented Nov. 10, 1959

2,912,559
OVEN WITH REPLACEABLE LINER

Norman W. Kirschke, Louisville, Ky., assignor to General Electric Company, a corporation of New York Application May 8, 1958, Serial No. 733,981

3 Claims. (Cl. 219—35)

This invention relates to ovens, and more particularly to baking ovens of the type especially suited for domestic use in the home.

Numerous improvements in domestic ovens have been made in recent years and these have provided better baking and broiling performance while at the same time reducing the cost of the product. However, none of the domestic ovens currently in use are completely satisfactory to housewives because of the difficulties generally encountered in keeping such ovens clean. After a relatively short period of use the walls of the oven become coated or incrusted with grease deposits resulting from spattering and smoke produced during cooking operations, and with other deposits resulting from food spillage and spattering. At the same time the heat generated in the oven maintains the oven walls at sufficiently high temperatures to cause the unwanted deposits to bake on the surfaces and form a hard film which is extremely difficult to remove by ordinary cleaning methods.

An important object of the present invention is to overcome this difficulty by providing an improved oven structure including a disposable oven liner for all of the walls of the oven.

Another object of the invention is to provide a novel oven liner which may be collapsed and folded to form a small compact package.

Another object of the invention is to provide an oven liner support which is easily removable from the oven and which is adapted to support both the liner and also one or more food support racks.

Further objects and advantages of the invention will become apparent as the following description proceeds, and the features of novelty which characterize the invention will be pointed out with particularity in the claims annexed to and forming a part of this specification.

Briefly stated, in accordance with one aspect of this invention there is provided a domestic oven so arranged that a collapsible aluminum foil liner may be supported therein on a supporting frame so that only the inner walls of the liner are exposed to food spattering and the vaporized grease and smoke generated during cooking operations.

For a better understanding of this invention by way of illustration and example, reference may be had to the following description and the accompanying drawings in which.

Figure 1:
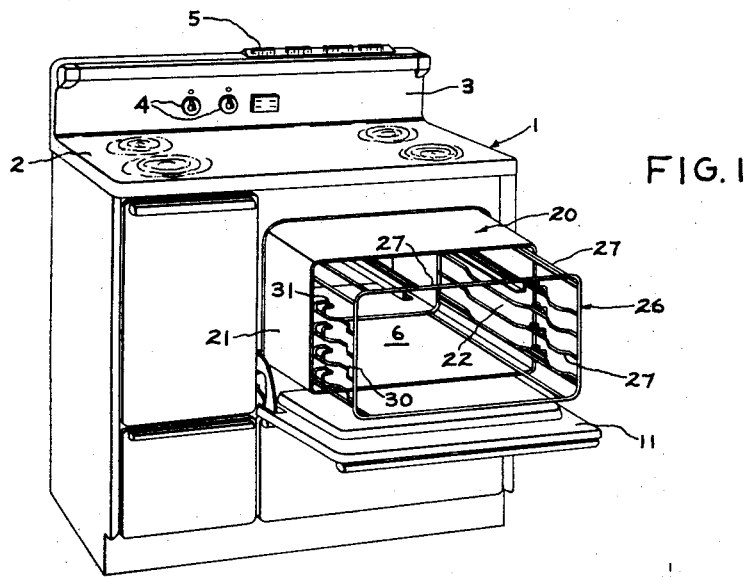
Fig. 1 is a perspective view of a domestic range including an oven constructed in accordance with the present invention.
Figure 2:
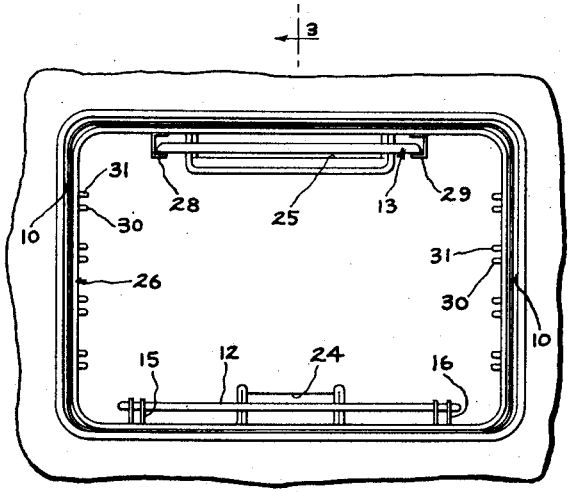
Fig. 2 is a front elevation view of the oven illustrated in Fig. 1.

Referring first to Fig. 1 of the drawing, the numeral 1 designates an electric range having a cooking top 2 upon which are mounted a plurality of surface heating units, a backsplasher 3, oven controls 4 and surface unit controls 5, these controls being mounted on backsplasher 3. Located within the body of range 1 is an oven generally designated by the numeral 6 constructed in accordance with the present invention.

While the illustrated embodiment of this invention is incorporated in a free standing domestic range, it will be understood that the invention is applicable to domestic ovens of various types including separate built-in ovens of the type which may be mounted in the wall of a kitchen or the like.

The oven compartment of oven 6 is formed by walls of sheet metal fixedly secured to the body of range 1, including a top wall 7, a bottom wall 8, a rear wall 9, and a pair of side walls 10. An oven door 11 is pivotally mounted on the range body so as to be movable into a position closing the front opening of oven 6.

Heat is supplied to oven 6 by means of a pair of removable electric heating units, including a baking unit 12 mounted adjacent the lower wall 8 and a broil unit 13 mounted adjacent upper wall 7. Bake unit 12 includes a heating portion formed from a tubular sheathed heating element bent into a generally rectangular form with its terminals in engagement with a terminal block 14 secured to rear wall 9 of the oven. The front portion of bake unit 12 is supported by a pair of foot members 15 and 16 fixedly secured to the front portion of the sheathed heating element.

Broil unit 13 includes a reflector 17 below which is mounted a tubular sheath heating element 18 which is preferably of sinuous configuration. The terminals of heating element 18 project rearwardly and are arranged to engage a terminal block 19 secured to rear oven wall 9. As described hereinafter, the front portion of broil unit 13 is supported by means associated with the oven liner support forming a part of the present invention.

As previously mentioned, food being cooked within oven 6 may give off grease vapors if its fat content is high and such vapors tend to condense on the inner surface of the oven walls. Also, particularly during broiling operations, food particles spatter onto the oven walls thus adding to the food deposits thereon. Finally, spillage or overflow of food being cooked occasionally occurs and this further adds to the deposits, particularly on the bottom wall. The relatively high temperatures in the oven cause the various deposits to bake on to form a hard film or coating which is extremely difficult to remove.

Figure 4:
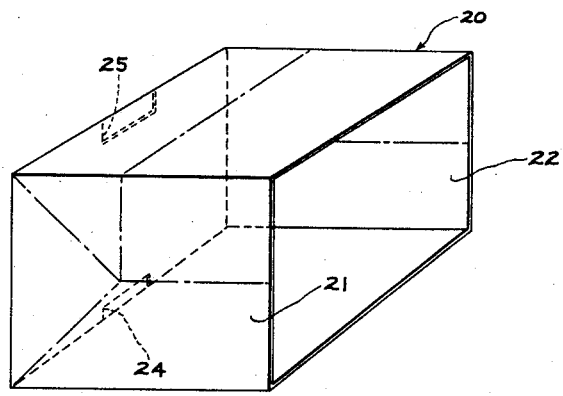
Fig. 4 is a perspective view of the oven liner utilized in the oven shown in Fig. 1.
Figure 5:
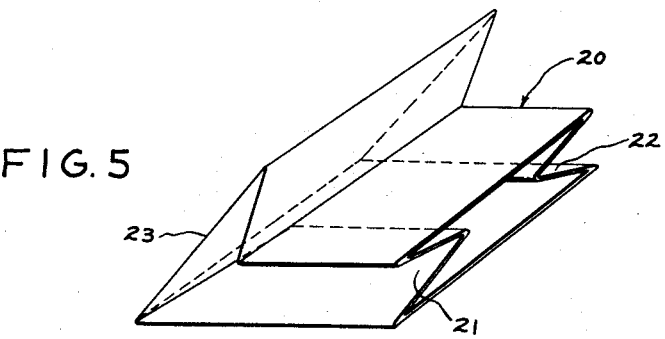
Fig. 5 is similar to Fig. 4 but shows the liner in partially collapsed position.
Figure 6:
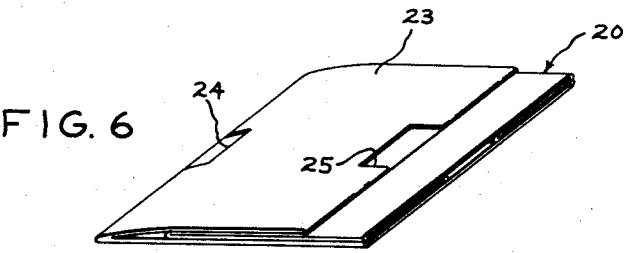
Fig. 6 is similar to Fig. 5 but shows the liner in its completely collapsed position.

In accordance with the present invention I provide a removable oven liner which effectively protects the structural walls of the oven from spattered or spilled food and most grease vapor, thus making it possible to simply remove and throw away the oven liner when it becomes soiled. As illustrated in Figs. 4–6, oven liner 20 is generally bag-shaped and is made up of rectangular panels which may be made of aluminum foil, for example. The side panels 21 and 22 of liner 20 are creased as indicated by broken lines so as to flex inwardly, thus permitting the liner to be folded as shown in Fig. 5 into the compact flat package illustrated in Fig. 6. Also it will be noted that rear wall 23 of liner 20 is provided with a pair of apertures 24 and 25 positioned so as to expose terminal blocks 14 and 19 respectively when the liner is positioned within the oven.

In order to support liner 20 within oven 6, I provide a wire rack or frame member 26 which includes a plurality of horizontally disposed wire elements 27 arranged to support each of the panels of the liner in close proximity to the oven compartment wall adjacent thereto. In the present embodiment, wire frame 26 is made up of front and rear rectangular frame elements with longitudinal wire elements welded thereto so as to form a generally rectangular cage structure, but it will be understood that frame members varying in structural details but nevertheless suitable for supporting oven liner 20 in close proximity to the oven walls may be utilized without departing from the spirit of the present invention.

In order to support broil unit 13 in the upper portion of the oven compartment, a pair of rail members 28 and 29 are fixedly secured to rack member 26 so as to support the edges of broil unit reflector 17 while permitting it to slide outwardly through the front opening of the oven when it is desired to remove the broil unit. Also, the wire elements of rack 26 which extend adjacent the side walls of the oven compartment are bent so as to provide inwardly projecting portions 30 which cooperate with support elements 31 welded thereto so as to provide means for supporting oven racks (not shown) at various levels within the oven.

Figure 3:
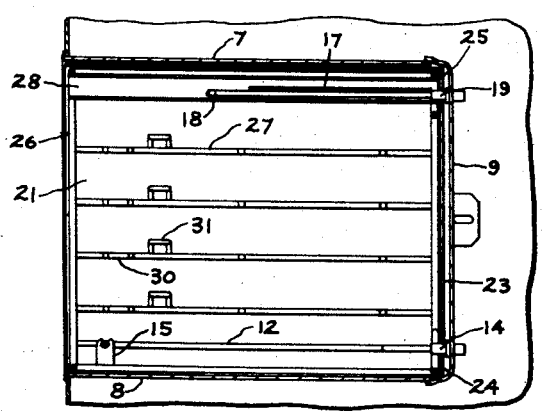
Fig. 3 is a cross-sectional view taken along the line 3—3 in Fig. 2.

It will of course be understood that oven liner 20 and frame member 26 are shown in partially withdrawn positions in Fig. 1 so as to illustrate more clearly the details of construction. In use, bag 20, which is received in the collapsed form shown in Fig. 6 is opened to the position shown in Fig. 4 before being inserted in oven 6. Oven heating units 12 and 13 are of course removed from the oven when the liner is to be changed after which rack member 26 and the soil liner may be withdrawn and completely removed. The soil liner is discarded and the clean liner placed over rack member 26, and this assembly is then inserted into the oven compartment. After it is in place, as illustrated in Fig. 3, heating units 12 and 13 may be replaced, it being noted that the terminal portions thereof may be inserted into terminals blocks 14 and 19 through openings 24 and 25 respectively in rear wall 23 of the liner.

While I have shown and described a particular embodiment of my invention, I do not desire the invention to be limited to the particular construction disclosed, and I intend by the appended claims to cover all modifications within the true spirit and scope of my invention.

What I claim is:

1. A range oven comprising a plurality of walls defining a heating compartment, a collapsible bag-shaped metal foil oven liner nested within said compartment for shielding all of the oven walls from soil, and a box-shaped frame of wire cage construction telescoped completely within said liner for holding the liner from collapsing, said frame including a plurality of rack supporting members on two of the opposite side portions thereof.

2. A range oven comprising a plurality of walls defining a heating compartment, an electrical receptacle in one of said walls, a removable electric heating unit positioned in said compartment, said heating unit having a terminal portion in engagement with said rectptacle, a collapsible bag-shaped metal foil oven liner nested within said compartment for shielding all of the oven walls, said liner having an aperture exposing said receptacle and adapted to receive said terminal portion therethrough, and a supporting frame of wire cage construction slidable completely within said liner for holding the liner from collapsing.

3. A range oven comprising a heating compartment defined by a top wall, a bottom wall, a pair of side walls and a rear wall, an oven door closing the front opening of said compartment, a first electrical receptacle in the upper portion of said rear wall, a second electrical receptacle in the lower portion of said rear wall, a removable electric broil unit having a terminal portion engageable with said first receptacle, a removable electric bake unit having a terminal portion engageable with said second receptacle, a collapsible bag-shaped metal foil oven liner nested within said compartment, said liner having rectangular top, bottom, side and rear panels corresponding in size and shape to said top, bottom, side and rear walls respectively, said rear panel having first and second apertures exposing said first and second receptacles respectively, and a supporting frame a wire cage construction slidable into the liner to prevent it from collapsing.

References Cited in the file of this patent

UNITED STATES PATENTS

| 2,236,992 | Broadley | Apr. 1, 1941 |
| 2,466,859 | Northup | Apr. 12, 1949 |
| 2,746,448 | Holmsten | May 22, 1956 |
| 2,772,627 | Newell | Dec. 4, 1956 |
| 2,841,132 | Philipp | July 1, 1958 |

FOREIGN PATENTS

| 59,876 | Norway | Sept. 26, 1938 |
| 1,016,946 | France | Sept. 10, 1952 |